United States Patent
Durazzo et al.

(10) Patent No.: US 9,167,050 B2
(45) Date of Patent: Oct. 20, 2015

(54) CONTROL POOL BASED ENTERPRISE POLICY ENABLER FOR CONTROLLED CLOUD ACCESS

(71) Applicant: Futurewei Technologies, Inc., Plano, TX (US)

(72) Inventors: Kenneth Durazzo, San Ramon, CA (US); Shree Murthy, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 40 days.

(21) Appl. No.: 13/732,159

(22) Filed: Dec. 31, 2012

(65) Prior Publication Data

US 2014/0053280 A1    Feb. 20, 2014

Related U.S. Application Data

(60) Provisional application No. 61/684,022, filed on Aug. 16, 2012.

(51) Int. Cl.
*H04L 29/08* (2006.01)
*H04L 29/06* (2006.01)

(52) U.S. Cl.
CPC ............ *H04L 67/32* (2013.01); *H04L 63/0281* (2013.01); *H04L 63/10* (2013.01); *H04L 63/20* (2013.01); *H04L 67/1097* (2013.01); *H04L 67/306* (2013.01)

(58) Field of Classification Search
CPC ....... H04L 9/0802; H04L 63/10; H04L 67/32; H04L 63/0281; H04L 63/20; H04L 67/1097; H04L 67/306; G06F 21/45
USPC ............................................ 726/2–21, 26–30
See application file for complete search history.

(56) References Cited

U.S. PATENT DOCUMENTS

| | | | | |
|---|---|---|---|---|
| 6,212,635 | B1 * | 4/2001 | Reardon | 713/165 |
| 6,226,750 | B1 * | 5/2001 | Trieger | 726/3 |
| 7,769,722 | B1 * | 8/2010 | Bergant et al. | 707/681 |
| 7,953,865 | B1 * | 5/2011 | Miller et al. | 709/227 |
| 8,290,152 | B2 * | 10/2012 | Montgomery et al. | 380/44 |
| 8,316,237 | B1 * | 11/2012 | Felsher et al. | 713/171 |
| 8,321,688 | B2 * | 11/2012 | Auradkar et al. | 713/189 |
| 8,341,427 | B2 * | 12/2012 | Auradkar et al. | 713/192 |
| 8,447,981 | B2 * | 5/2013 | Liang et al. | 713/171 |
| 8,528,067 | B2 * | 9/2013 | Hurry et al. | 726/9 |
| 8,566,247 | B1 * | 10/2013 | Nagel et al. | 705/59 |
| 8,566,578 | B1 * | 10/2013 | Banerjee | 713/153 |

(Continued)

OTHER PUBLICATIONS

Foreign Communication From a Counterpart Application, PCT Application No. PCT/US2013/054487, International Search Report dated Oct. 9, 2013, 4 pages.

(Continued)

*Primary Examiner* — Joseph P Hirl
*Assistant Examiner* — J. Brant Murphy
(74) *Attorney, Agent, or Firm* — Conley Rose, P.C.; Grant Rodolph; Brandt D. Howell

(57) ABSTRACT

A method for controlling access to a Cloud, comprising receiving traffic from an Enterprise user at a gateway, wherein the traffic carries a first key specific to the Enterprise user for use internal to the gateway, replacing the first key with a second key, wherein the second key is a Cloud-negotiated key generic to a plurality of Enterprise users which permits access to the Cloud, and sending traffic to the Cloud.

13 Claims, 6 Drawing Sheets

(56) References Cited

U.S. PATENT DOCUMENTS

| | | | | |
|---|---|---|---|---|
| 8,621,220 B2* | 12/2013 | Lynch | ............... | 713/171 |
| 8,625,802 B2* | 1/2014 | Parann-Nissany | ............ | 380/278 |
| 8,813,225 B1* | 8/2014 | Fuller et al. | ................. | 726/23 |
| 2002/0059371 A1* | 5/2002 | Jamail et al. | ................. | 709/203 |
| 2003/0061506 A1* | 3/2003 | Cooper et al. | ............... | 713/201 |
| 2004/0083393 A1* | 4/2004 | Jordan et al. | ................. | 713/202 |
| 2005/0038848 A1* | 2/2005 | Kaluskar et al. | ............ | 709/201 |
| 2006/0048142 A1* | 3/2006 | Roese et al. | .................. | 717/176 |
| 2006/0294373 A1* | 12/2006 | Stamos et al. | ................. | 713/165 |
| 2009/0086978 A1* | 4/2009 | McAvoy et al. | ............. | 380/279 |
| 2009/0239531 A1* | 9/2009 | Andreasen et al. | ........... | 455/433 |
| 2009/0313466 A1* | 12/2009 | Naslund et al. | ............... | 713/155 |
| 2010/0191783 A1* | 7/2010 | Mason et al. | ................. | 707/822 |
| 2010/0211781 A1* | 8/2010 | Auradkar et al. | ............. | 713/168 |
| 2010/0211782 A1* | 8/2010 | Auradkar et al. | ............. | 713/168 |
| 2010/0325199 A1* | 12/2010 | Park et al. | ..................... | 709/203 |
| 2010/0333116 A1* | 12/2010 | Prahlad et al. | ................ | 719/328 |
| 2011/0022642 A1* | 1/2011 | deMilo et al. | ................ | 707/805 |
| 2011/0072489 A1* | 3/2011 | Parann-Nissany | ............... | 726/1 |
| 2011/0219434 A1* | 9/2011 | Betz et al. | ........................ | 726/5 |
| 2011/0225423 A1* | 9/2011 | Lynch | ........................ | 713/171 |
| 2011/0277026 A1* | 11/2011 | Agarwal et al. | .................. | 726/8 |
| 2011/0311055 A1* | 12/2011 | Parann-Nissany | ............ | 380/278 |
| 2012/0005724 A1* | 1/2012 | Lee | .................................... | 726/1 |
| 2012/0030737 A1* | 2/2012 | Pagan et al. | ........................ | 726/5 |
| 2012/0072992 A1* | 3/2012 | Arasaratnam et al. | ........... | 726/26 |
| 2012/0185913 A1* | 7/2012 | Martinez et al. | .................. | 726/1 |
| 2012/0198268 A1* | 8/2012 | Qureshi | ........................ | 714/4.1 |
| 2012/0222106 A1* | 8/2012 | Kuehl | .............................. | 726/11 |
| 2012/0240113 A1* | 9/2012 | Hur | .................................. | 718/1 |
| 2012/0290647 A1* | 11/2012 | Ellison et al. | ................. | 709/203 |
| 2012/0296977 A1* | 11/2012 | Ellison et al. | ................. | 709/204 |
| 2012/0304277 A1* | 11/2012 | Li et al. | ........................... | 726/12 |
| 2013/0042106 A1* | 2/2013 | Persaud et al. | ................. | 713/165 |
| 2013/0080509 A1* | 3/2013 | Wang | ........................... | 709/203 |
| 2013/0160105 A1* | 6/2013 | Huang et al. | ...................... | 726/8 |
| 2013/0204849 A1* | 8/2013 | Chacko | ........................ | 707/692 |
| 2013/0238752 A1* | 9/2013 | Park et al. | ..................... | 709/217 |
| 2014/0019753 A1* | 1/2014 | Lowry et al. | .................. | 713/155 |

OTHER PUBLICATIONS

Foreign Communication From a Counterpart Application, PCT Application No. PCT/US2013/054487, Written Opinion dated Oct. 9, 2013, 5 pages.

* cited by examiner

CONTROL POOL BASED ENTERPRISE POLICY ENABLER FOR CONTROLLED CLOUD ACCESS

CROSS-REFERENCE TO RELATED APPLICATIONS

This application claims priority to U.S. Provisional Application No. 61/684,022, filed Aug. 16, 2012 by Kenneth Durazzo and Shree Murthy titled "Enterprise Policy Enabler for Controlled Cloud Access," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Workload virtualization is a fundamental enabler for an Enterprise's transition to the Cloud. Enterprises may be any organizations which use computers, comprising corporations, small businesses, non-profit institutions, governmental bodies, etc., and Enterprise users may be individual users of Enterprise computers. Due to various benefits of the public Cloud (i.e., a non-local computing resource accessed via a network infrastructure), including reduced capital expenditures (CapEx), scalability, flexibility, elasticity, pay as you grow models, etc., various Enterprises owners, users, and/or administrators may wish to migrate applications and resources into the Cloud.

In the changing world of Information and Communication Technology (ICT) and resource virtualization, public/private Cloud integration is pivotal to Enterprise Information Technology (IT). However, security, compliance, transparency, management and control concerns, as well as the diverse nature of the associated policies, make Cloud adoption challenging.

Public Clouds may be shared, generic infrastructures built to support multiple users. The generic infrastructure of the Cloud may not meet the purpose-built Enterprise mandated business policies, transparency, security and control requirements. One challenge of an Enterprise IT organization is how to take advantage of the public Cloud while (a) maintaining the governance and control necessary to meet the Enterprise's business requirements, and (b) keeping the complexity of the new paradigm manageable.

SUMMARY

In one aspect, the disclosure includes a method for controlling access to a Cloud, comprising receiving traffic from an Enterprise user at a gateway, wherein the traffic carries a first key specific to the Enterprise user for use internal to the gateway, replacing the first key with a second key, wherein the second key is a Cloud-negotiated key generic to a plurality of Enterprise users which permits access to the Cloud, and sending traffic to the Cloud.

In another aspect, the disclosure includes a method for exchanging data between an Enterprise and a Cloud, comprising receiving traffic from an Enterprise user at an Enterprise Policy Enabler, evaluating the traffic based on information specific to the user, information specific to the resource being accessed, or both, applying a policy on the traffic at the Enterprise Policy Enabler based on the results of the evaluation, and sending traffic to a destination Cloud.

In yet another aspect, the disclosure includes an apparatus comprising a processor configured to establish an integration layer, wherein the integration layer comprises an Enterprise-facing control pool configured to receive data ingress from an Enterprise user, apply a first policy to the data, and send data to at least one Cloud, and a Cloud-facing control pool configured to receive data ingress from the at least one Cloud, apply a second policy to the data, and send data to the user, and wherein changes to the policy of one control pool do not affect the policy of the other control pool.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
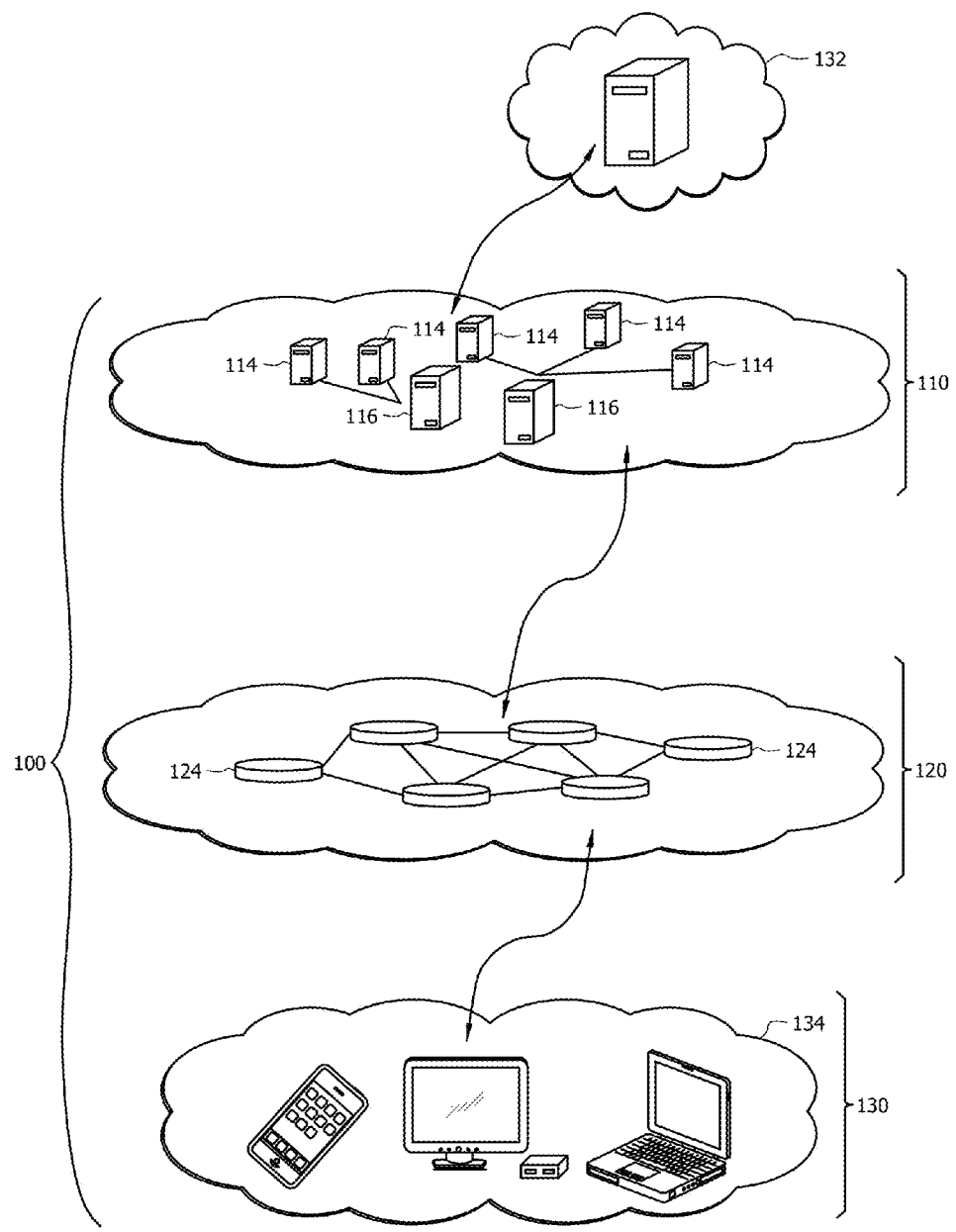
FIG. 1 is a schematic diagram of an embodiment of a Cloud service system.

In one aspect, the disclosure includes a single-platform complete Cloud- or Enterprise-deployable integration layer that uses various policies and data controls to permit an Enterprise to treat one or more Clouds as an extension of the Enterprise. The integration layer may further permit one or more Clouds to specify certain access protocols and/or other configurations for accessing the particular Cloud. The integration layer further permits complete isolation of the Enterprise and the Cloud(s) such that changing the policies, protocols, data controls or configurations on one side of the integration layer will not affect the other side of the integration layer. Thus, the integration layer comprises two "control domains" or "control pools" (e.g., one on the Cloud side, i.e., Cloud-facing, and one on the Enterprise side, e.g., Enterprise-facing), and the policy and control within each domain is independent of the other domain. Alternately, this disclosure allows for discrete management of a deployed device by segmenting and isolating the system into two control pools, one facing each entity, which upon configuration will not permit either entity to control the entire system, while still permitting each entity full control of their portion of the system. For example, a Cloud may control and configure a Cloud-facing interface, an Enterprise may control and configure an Enterprise-facing interface, and the two configuring interfaces may share no configuration or administration data.

In another aspect, the disclosure includes a configurable proxy-based abstraction layer which may render Enterprise users opaque to one or more Clouds. The proxy-based interface abstraction may further render one or more Clouds opaque to Enterprise users. For example, in one embodiment, the Enterprise authentication, localized within the deployed system, may be presented to the Cloud as a single opaque user, thereby keeping the Enterprise users only configured within the Enterprise. Certain embodiments permit an Enterprise administrator to configure a service pool of Cloud providers such that policy attributes may guide which Cloud Enterprise users may access in a given circumstance.

In another aspect, the disclosure includes a gateway-based system and method for controlling Enterprise users' access to one or more Clouds (and thereby further preventing gateway circumvention) using a Cloud-negotiated key and an internal-use artificial key, wherein users are issued an internal-use artificial key for interfacing with the gateway, and the gateway securely maintains the Cloud-negotiated key permitting access to one or more Clouds. The disclosure may segment the Enterprise user-to-Cloud transaction into three parts: 1) Enterprise user to gateway, 2) gateway to Cloud, and 3) mapping between Enterprise user and gateway. In the first part, the Enterprise user and the gateway may establish a unique security session and key, the key being unique to the Enterprise user and as permanent as required by the Enterprise system administrator. In the second part, the gateway may establish a session and unique key with the remote Cloud service, where the key is unique to the gateway. In the third part, the gateway may map the Enterprise user key and Cloud key, keeping records and track of sessions. In such a system, if the Enterprise user attempted to access the Cloud from a non-gateway enabled area, e.g., from a public WLAN, the Enterprise user would be unable to establish a session because the Cloud would expect the Enterprise user key supplied by the gateway, which the Enterprise user would not have. Consequently, the Enterprise users' access to one or more Clouds may be controlled using the gateway.

In another aspect, the disclosure includes a system and method for providing granular control over an Enterprise user's Cloud-bound requests based on user-specific information, e.g., limiting access based on download restrictions, location of the user, identity of the user, device type (e.g., mobile device vs. desktop), the object/resource being accessed, and/or other factors specific to the user. This functionality may bind intelligent policies, which may reside in separate policy control points, permitting aggregation and application within the gateway. These policies may be based on user or user-group identity, and also on properties associated with the user such as location of the user, access type, device type, the object/resource being accessed by the user, etc. Using the disclosed mechanisms, an Enterprise administrator may ensure that only specified users on specific devices or locations may access content stored within a particular Cloud. The disclosed system and method may accomplish the above by examining packets up to the application level by looking at different aspects of the request and/or response to determine how to handle the request and/or response based on static and dynamic inputs. Rather than simply prevent access to a system or network, e.g., like a conventional firewall, the disclosed system and method may be configured to perform additional tasks, e.g., encryption of objects, compression, optimization, traffic steering, or traffic distribution based on a separate factor, e.g., load factor, time of day, cost, available bandwidth, etc.

In another aspect, the disclosure includes a system and method for providing granular control over an Enterprise user's Cloud-bound requests based on the content of the data, e.g., requiring specific storage locations based on data classification, encryption, compression, etc., and/or based on user-external information, e.g., Cloud loading, response times, throughput, time of day, active monitoring block. In one embodiment, the abstraction may allow the policy to guide where the object should be placed for a particular service. For example, the policy may provide for security services, precluding placing certain objects in the public Cloud. If an Enterprise user attempted to place such objects in the public Cloud, the policy may be invoked by the gateway and the object may be redirected without user knowledge or intervention to a new location. Upon subsequent retrieval of the object, the end user may still be unaware that the object was not stored in the intended Cloud location, but rather was rerouted to an alternate storage location. In another embodiment, the disclosure provides a mechanism for Enterprise users to use a Cloud resource based on the requirements of the Enterprise user. Such embodiments may use an active monitoring entity to monitor the performance (e.g., throughput, response time, etc.) of a Cloud resource and distribute the users to best available Cloud resource based on the monitoring results. This mechanism may enable load distribution, disaster recovery, and/or other beneficial system functionalities.

Any or all of the above aspects of the disclosed system and method may be carried out in conjunction with an embodiment of the disclosed Enterprise Policy Enabler, which may also be referred to herein as an integration layer or a gateway. The Enterprise Policy Enabler may provide a set of software functions that enable multi-entity configuration, Cloud service abstractions, and the application of aggregated Enterprise policies for Cloud based traffic. The Enterprise Policy Enabler may include a dual persona/hybrid configuration model for the isolation of portions of the system configuration. The Enterprise Policy Enabler may also provide for aggregation of Enterprise policies applied to Cloud services while an Enterprise Information Technology (IT) administrator retains granular control over the specific users and/or policies. Additionally, the Enterprise Policy Enabler may provide new security models which allow the Cloud to be adopted using intelligent policies for users/objects/devices and traffic types.

The Enterprise Policy Enabler may be deployably disposed on any suitable device, e.g., in the branch office router, in the data center switch, in a node of the Cloud, or another network node. In a branch office, split tunneling may be adopted to go directly to the Cloud rather than directing all the traffic through the data center. If so configured, the Cloud enabler may ensure that the policies are consistently enforced for Cloud-bound traffic. Placement of the software in the data center may ensure that all the Cloud-bound traffic through the data center is subject to the Enterprise specific policies and third-party provider-specific service level agreements (SLAs), thus behaving as an intermediary for Cloud access.

FIG. 1 is a schematic diagram of an embodiment of a Cloud service system 100. Content storage and dissemination to, from, and throughout the Cloud may be based on public network or Cloud infrastructures, which may support or provide relatively large scale content processing, storage, and distribution for dynamically authorized data receivers (e.g., content routers). The Cloud service system 100 may have a three-layer architecture that comprises a content/data storage layer 110, a content/data distribution layer 120, and a content/data consumption layer 130. The content/data storage layer 110 may be a centralized content storage service that is provided by a Cloud service provider. The content/data distribution layer 120 may be a content delivery network (or service) that provides content distribution over a public network. The content/data consumption layer 130 may comprise an Enterprise 134 with various devices connected to each other via a network, e.g., a local area network (LAN) or wide area network (WAN).

The content/data storage layer 110 may be implemented using a Cloud infrastructure or service and may comprise one or more storage services 114 and/or one or more Cloud-based application services 116. The storage services 114 may comprise any network components or devices (e.g., computers, storage devices, and/or memory devices) configured for storing data in a network or data center.

The Cloud service system 100 may also comprise or may be coupled to one or more third parties 132, e.g., a software as a service (SaaS) or an on-demand streaming media provider, which may publish content via one or more interfaces provided by the Cloud-based application services 116. The third parties 132 may optionally publish content data using any suitable device, computer, or network component, such as servers, personal computers (PCs), and/or similar devices. The Cloud-based application services 116 may be configured to receive the content from the third parties 132 and store the content in the storage services 114. The Cloud-based application services 116 may also process the content stored in the storage services 114, e.g., via Cloud storage application programming interfaces (APIs).

The content/data distribution layer 120 may comprise a plurality of routers 124. The routers 124 may comprise content routers configured to route content data based on name prefixes and cache at least some of the routed content. The routers 124 may also comprise other network nodes, such as other types of routers, bridges, and/or switches that may route data, e.g., based on different routing schemes. For example, the routers 124 may also comprise routers that route Internet Protocol (IP) packets and/or Ethernet packets based on network (e.g., Media Access Control (MAC) and/or IP) addresses.

The content/data consumption layer 130 may comprise an Enterprise 134 that may access, obtain or consume content. The Enterprise 134 may be configured to access the Cloud system service 100. The Enterprise 134 may include one or more devices, e.g., computers, network components, mobile devices (e.g., smartphones and computer tablets), and/or similar devices, connected to a LAN. The LAN may comprise a storage device or file server, which may be direct access storage devices (DASD), coupled to one or more storage services 114, one or more Cloud-based application services 116, and/or one or more computer systems or terminals 112.

The content data flow in the Cloud service system 100 may be in the direction from the content/data storage layer 110 to the content/data consumption layer 130 via the content/data distribution layer 120 (as shown by the arrows in FIG. 1). The content data may be published to and stored at the content/data storage layer 110, routed through and at least partially cached at the content/data distribution layer 120, and then delivered to the content/data consumption layer 130. To provide end-to-end network security and data confidentiality protection in storage and delivery via the Cloud, the content data may also be encrypted at Cloud-based storage and delivery channels, where only authorized end users, e.g., users at Enterprise 134, may decrypt and access the content.

Figure 2:
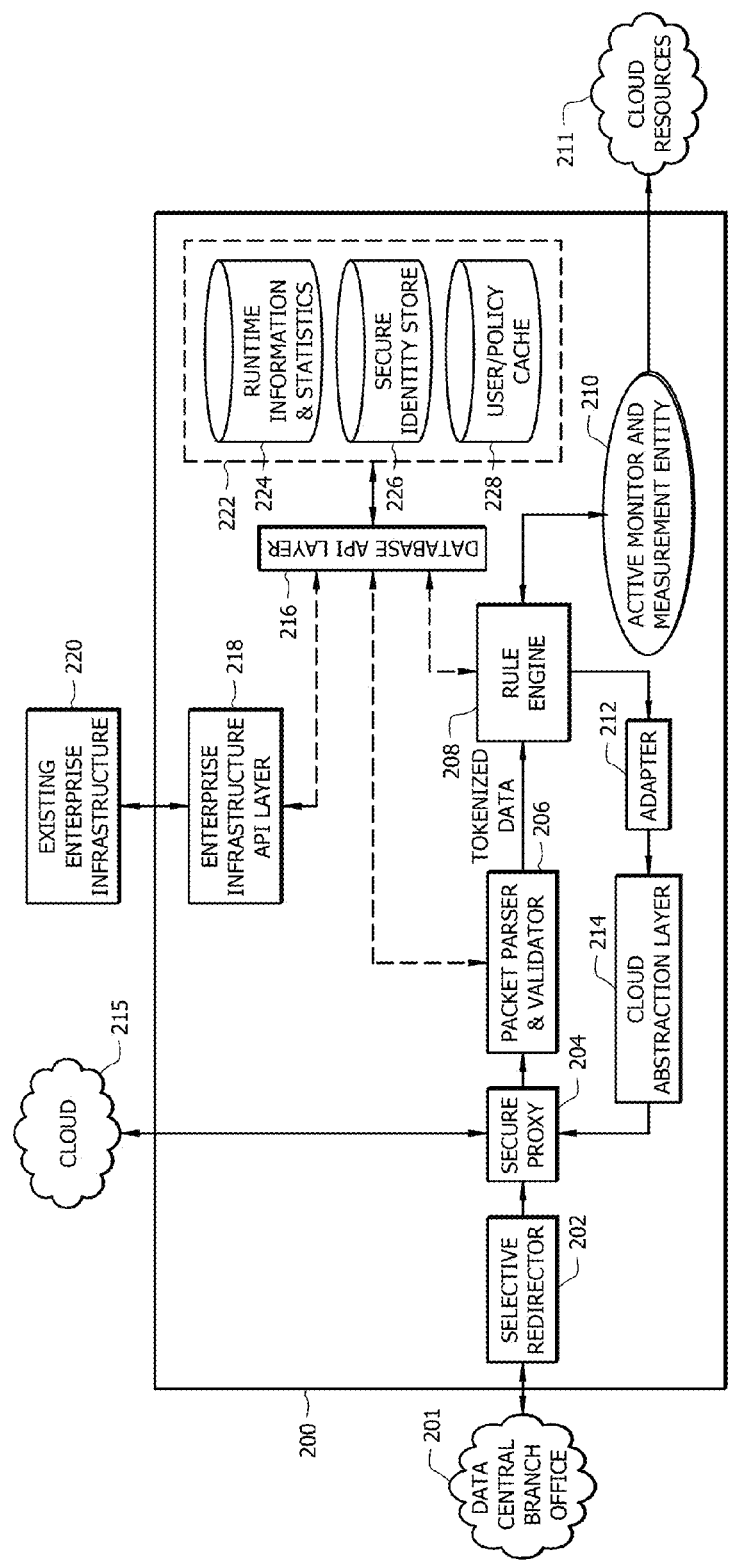
FIG. 2 is a schematic diagram of an embodiment of a control domain or control pool of an Enterprise Policy Enabler.

FIG. 2 is a schematic diagram of various components of an embodiment of a control domain or control pool of an Enterprise Policy Enabler 200 as it processes data ingress from an Enterprise user (not pictured). The Enterprise Policy Enabler 200 may include a selective redirector 202 configured to exchange data with a data center or branch office 201, e.g., content/data consumption layer 130 of FIG. 1, a secure proxy 204, a packet parser and validator 206, a rule engine 208, an active monitor/measurement module 210, an adapter 212, and a cloud abstraction layer 214 coupled to a destination Cloud 215, e.g., content/data storage layer 110 of FIG. 1. In some embodiments, Cloud 215 comprises a plurality of individual Clouds. In some embodiments, Cloud 215 may comprise Cloud Resource 211. The Enterprise Policy Enabler 200 may also include a database access API layer 216 and an Enterprise Infrastructure Application Programming Interface (API) layer 218 configured to exchange data with an Existing Enterprise Infrastructure 220, a database access API layer 216 configured to exchange data with multiple data stores 222. The multiple data stores 222 may comprise a runtime information and statistics unit 224, a secure key store 226, and a user/policy store/cache 228.

The selective redirector 202 may selectively redirect traffic to the secure proxy 204, e.g., a hypertext transfer protocol (http) proxy. The policies for selectively redirecting the traffic at selective redirector 202 may be integrated into the platform implementing the Enterprise Policy Enabler 200. If the traffic flow from selective redirector 202 is encrypted, e.g., transmitted via a secure connection, secure proxy 204 may decrypt the traffic flow. Secure proxy 204 may pass the information in clear, i.e., unencrypted, to the packet parser and validator 206, e.g., an http parser, a deep packet inspection (DPI) mechanism, etc. The packet parser and validator 206 may examine the information in clear. The packet parser and validator 206 may extract useful information from the data packets, e.g., information contained in an http header. The information extracted by the packet parser and validator 206 may include, without limitation, user information, a requested method, a requested object, a requested Cloud 215, requested Cloud resources 211, etc. The packet parser and validator 206 may validate the data by ensuring that the packets are from an authenticated source, e.g., by verifying that the Enterprise user has the required access key and credentials in secure identity store 226, by verifying that the message authentication is valid, etc. The packet parser and validator 206 may optionally collect statistical information on packets and/or may search for protocol non-compliance, viruses, spam, intrusions, or other defined criteria to decide whether the packet may pass through to the Cloud 215 or if it needs to be routed to a different destination. For example, when an Enterprise policy disallows storage of the confidential data on a public cloud, if an Enterprise user intends to store confidential data in a public cloud, the packet parser and validator 206 may reroute the confidential data to a secure storage location, e.g., a private cloud. The statistical information collected by the packet parser and validator 206 may be stored in the secure identity store 224. The packet parser and validator 206 may convert the data packet information into opaque tokens. Opaque tokens may be understood as abstract objects, i.e., data objects without an associated context, as viewed by the rule engine 208. The packet parser and validator 206 may be configured to exchange data packets comprising opaque tokens with a rule engine 208.

The rule engine 208 may be a software system that executes one or more policy rules in a runtime production environment. Some actions performed by the rule engine 208 according to its policy rules may include optionally applying security policies, redirection policies, Quality of Service (QoS) policies, optimization policies, and/or other such policies known in the art to the traffic before forwarding. The rule engine 208 may view the extracted elements from the tokenized data packets received from the packet parser and validator 206 as opaque tokens, and may extended the rules to other token objects, e.g., user information, cloud resource, object, location, device type, method/operation being performed, etc., as required and as discussed below. The rule engine 208 may utilize the information contained in tokenized data packets to decide how to handle the traffic. The rule engine 208 may also modify and/or adapt the original request to suit the appropriate destination's policies using mechanisms present in adapter 212 and cloud abstraction layer 214. Enterprise information technology (IT) administrators may configure the modifications and/or adaptations as needed to ensure that the destination's SLA requirements, if any, are enforced before forwarding the request. The rule engine 208 may access and use the user and the policy information present in the user/policy cache 228, as well as the secure identity store 226. For example, the rule engine 208 may remove origin-identifying information that clearly indicates the Enterprise user, e.g., header information, from the traffic and replace such information with a protected, origin-obscuring Enterprise user identification (ID) which does not permit identification of the Enterprise user by the receiving party. By using a protected Enterprise user ID paradigm, the Enterprise Policy Enabler 200 may render the Enterprise user opaque to Cloud 215. A similar protocol may be used to control an Enterprise user's access to Cloud 215. If an Enterprise user is issued an internal-use artificial key for interfacing with Cloud 215, the rule engine may replace the artificial key in the traffic with a Cloud-negotiated key which permits access to the Cloud 215. Additionally, if an Enterprise user's traffic indicates (a) that it originates from a particular user or user-class (e.g., supervisor, employee, IT administrator, etc.), location (e.g., the United States, Europe, a corporate office, etc.), device type (e.g., mobile device, desktop, etc.), or other user-specific information; (b) that access to a particular object/resource is requested (e.g., secure backup information, confidential information, etc.), etc.; or (c) that a specific taxonomy of data is contained (e.g., classified, encrypted, compressed, etc.), the rule engine 208 may apply forwarding or restriction rules to reroute, intercept, or deny traffic such access, and may optionally send traffic to an alternate Cloud within Cloud 215 (when Cloud 215 comprises a plurality of individual Clouds), or to alternate Cloud resources 211 to accomplish the request. Such rerouting may be opaque to the Enterprise user in that the Enterprise user is unaware of the rerouting.

An active monitor/measurement module 210 may be configured to receive information from one or more Cloud resources 211. Although depicted separately, in some embodiments Cloud resources 211 may be integral to Cloud 215. In embodiments wherein Cloud 215 comprises a plurality of individual Clouds, Cloud resources 211 may be located on one or more individual Clouds. The active monitor/measurement module 210 may monitor the performance, e.g., bandwidth, response time, latency, congestion, network loss, gating speeds, etc., of one or more Cloud resources 211 and, depending on the requirements, inform the rule engine 208 to selectively distribute the data traffic to available Cloud resources 211 as needed to meet the requirements of the users' requests and SLAs. The actions taken on the traffic at the rule engine 208 as informed by the active monitor/measurement module 210 may be based on the business and/or economic requirements of the Enterprise, and may include actions defined by the Enterprise IT administrator for the Enterprise users/user groups. The Existing Enterprise Infrastructure 220, e.g., the proprietary Active Directory schema, or policy definitions, may be leveraged through the Enterprise Infrastructure API layer 218 to obtain the user/user-group, authentication, and/or authorization information, and the Enterprise policies associated with the users. Statistical and other run-time information may also be maintained by the Enterprise Policy Enabler 200, which may be used for auditing purposes.

Figure 3:
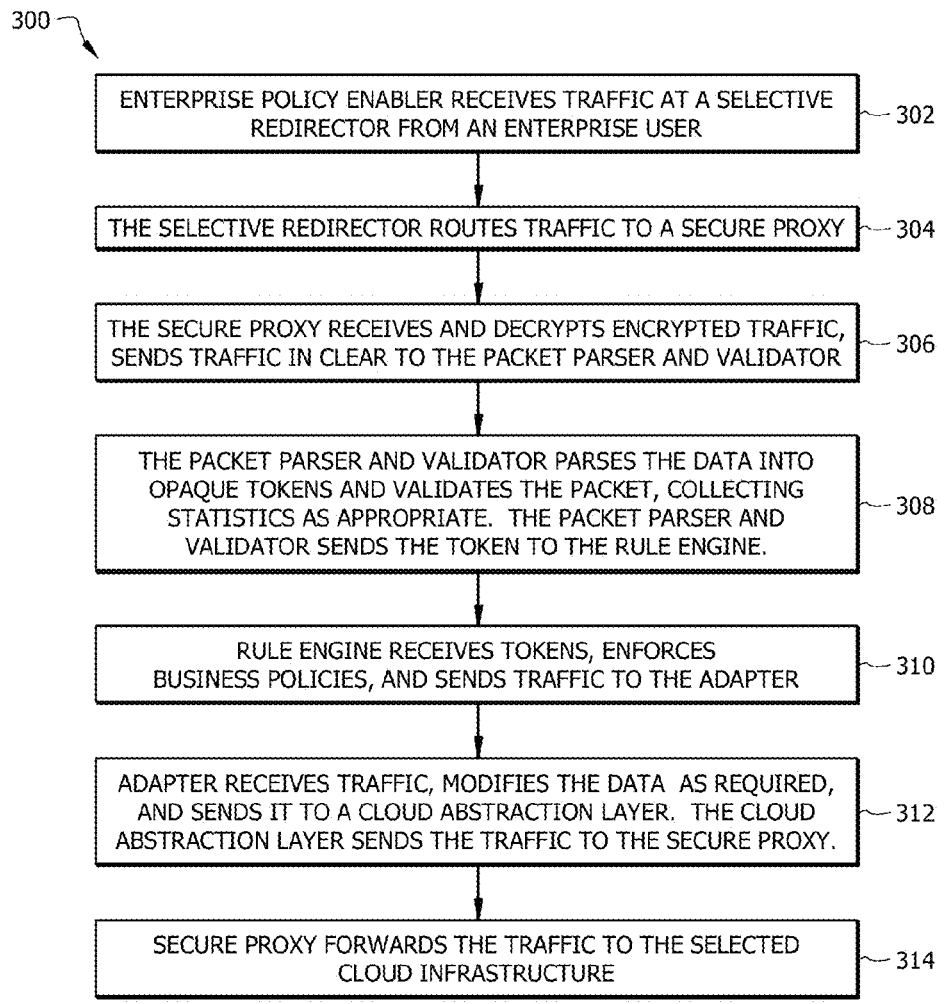
FIG. 3 is a flowchart describing a method of processing outbound traffic using an embodiment of an Enterprise Policy Enabler.

FIG. 3 is a flowchart describing a method 300 of processing outbound traffic using an embodiment of an Enterprise Policy Enabler. In FIG. 3, traffic from a data center or branch office, e.g., branch office 201 of FIG. 2, passes through the Enterprise Policy Enabler gateway, e.g., Enterprise Policy Enabler 200 of FIG. 2, to access resources in the Cloud infrastructure, e.g., Cloud 215 of FIG. 2. At block 302, the Enterprise Policy Enabler may receive traffic at a selective redirector, e.g., selective redirector 202 of FIG. 2, from an Enterprise user requesting access to resources residing in the Cloud infrastructure. At block 304, the selective redirector may route traffic to a secure proxy, e.g., secure proxy 204 of FIG. 2. Once received by the secure proxy at block 306, the secure proxy may decrypt the traffic if it is encrypted, and may send the traffic in clear to a packet parser and validator, e.g., packet parser and validator 206 of FIG. 2. At block 308, the packet parser and validator may parse the data into opaque tokens, validate the data packet, and collect statistical information on the process. To accomplish these tasks and to record the relevant results, the packet parser and validator may use a runtime information and statistics data store, a secure identity data store, and/or a user/policy cache data store, e.g., the runtime information and statistics data store 224, the secure identity data store 226, and the user/policy cache data store 228 of FIG. 2, as accessed through a database API layer, e.g., the database API layer 216 of FIG. 2. The packet parser and validator may send tokens to a rule engine, e.g., rule engine 208 of FIG. 2. At block 310, the rule engine may receive the tokens and enforce business policies on the opaque tokens as specified, e.g., by an Enterprise IT administrator or by a Cloud resource, and may send traffic along to an adaptor, e.g., the adaptor 212 of FIG. 2. At block 312, the adaptor may receive and modify the traffic as required and send the traffic to a cloud abstraction layer, e.g., the cloud abstraction layer 214 of FIG. 2, for final processing. The cloud adaptation layer may perform the API mapping and the required authentication/building of messages as required by the destination Cloud adaptation, based on the policies selects a specific Cloud. The cloud adaptation layer may forward the traffic to the secure proxy, and at block 314 the secure proxy may forward the data to the selected cloud infrastructure.

Figure 4:
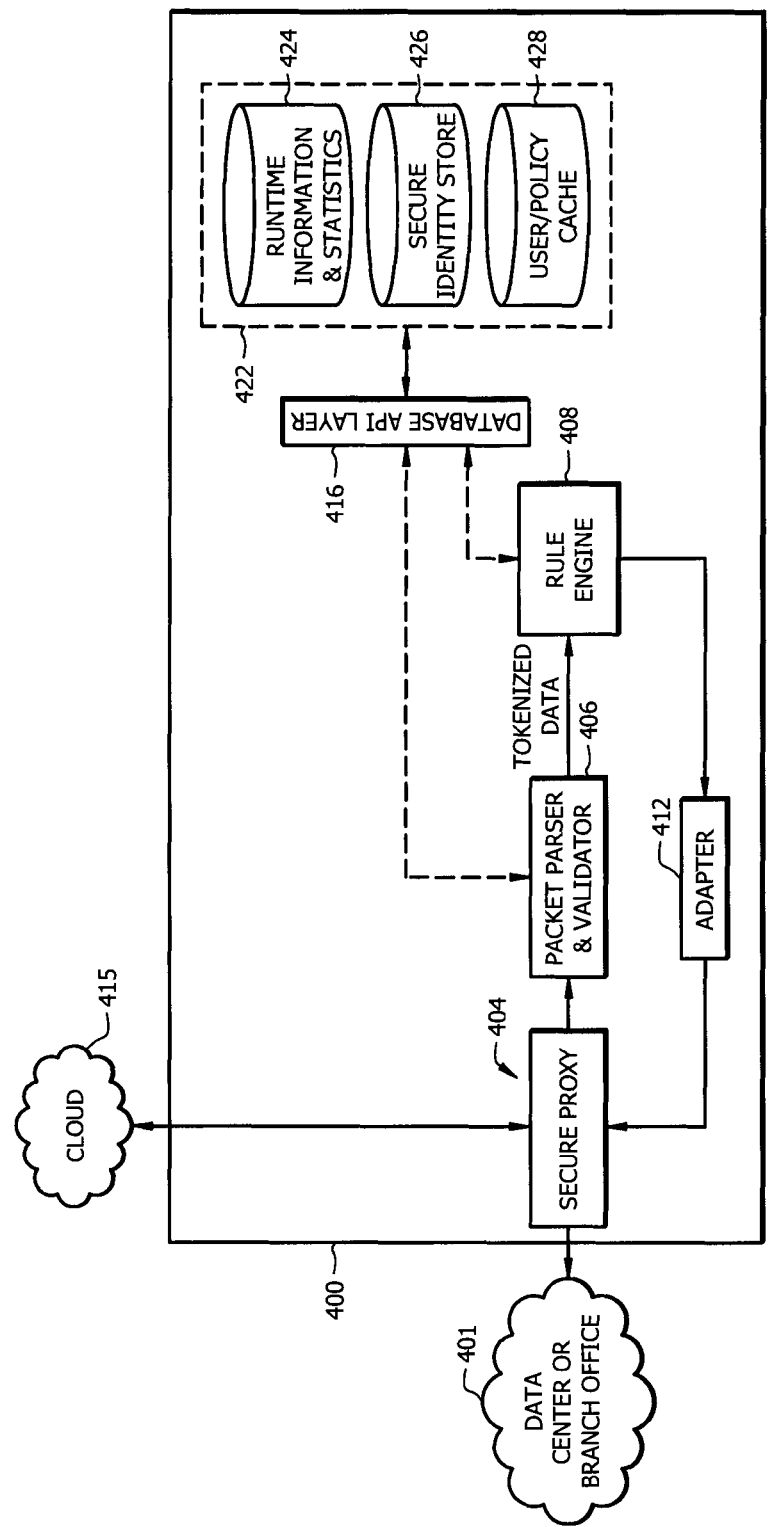
FIG. 4 is a schematic diagram of another embodiment of a control domain or control pool of an Enterprise Policy Enabler.

FIG. 4 is a schematic diagram of various components of an embodiment of a control domain or control pool of an Enterprise Policy Enabler 400 configured to process data ingress from a Cloud, e.g., traffic sent by the Cloud in response to a request from an Enterprise user. The data center or branch office 401, secure proxy 404, packet parser and validator 406, rule engine 408, adapter 412, Cloud 415, database API layer 416, data store 422, runtime information and statistics store 424, secure identity store 426, and user/policy cache store 428 of FIG. 4 may be the same as the corresponding components of FIG. 2. The secure proxy 404 may receive data ingress from the Cloud 415, may decrypt the traffic if encrypted, and may send the traffic in clear to a packet parser and validator 406. The packet parser and validator 406 may parse the data into opaque tokens, may validate the data packet using a secure identity data store 426 and/or a user/policy cache data store 428, and may collect statistics via a runtime information and statistics data store 424, each contained within a data store 422 accessible via a database API layer 416. The packet parser and validator 460 may send opaque tokens to a rule engine 408. The rule engine 408 may receive the tokens and enforce business policies on the opaque tokens as specified, e.g., by an Enterprise IT administrator, and may send traffic to an adaptor 412. The rule engine 408 may access and use the information present in the secure identity store 426. For example, the rule engine 408 may remove information from the traffic that clearly indicates the particular Cloud 415 resource, e.g., header information, and replace such information with a protected Cloud 415 identification (ID). By using a protected Cloud 415 ID paradigm, the Enterprise Policy Enabler 400 may render the Cloud 415 resources opaque to one or more Enterprise users at the data center or branch office 401. The adaptor 412 may modify the traffic as required and send the traffic to a destination Enterprise user at the data center or branch office 401 via the secure proxy 404.

Figure 5:
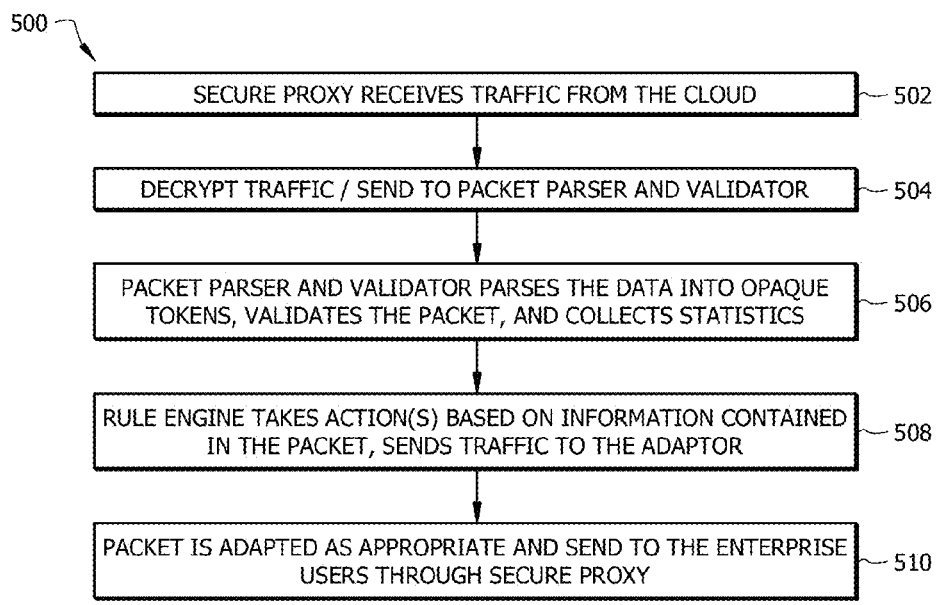
FIG. 5 is a flowchart describing a method of processing traffic inbound traffic using an embodiment of an Enterprise Policy Enabler.

FIG. 5 is a flowchart describing a method 500 of processing traffic inbound traffic using an embodiment of an Enterprise Policy Enabler, e.g., the Enterprise Policy Enabler 400 of FIG. 4. In FIG. 4, traffic from a Cloud, e.g., the Cloud 415 of FIG. 4, passes through the Enterprise Policy Enabler gateway, e.g., Enterprise Policy Enabler 400 of FIG. 4, to a data center or branch office, e.g., branch office 401 of FIG. 4. At block 502, a secure proxy, e.g., the secure proxy 404 of FIG. 4, may receive traffic, e.g., data responsive to an Enterprise user request, from the Cloud. At block 504, the security proxy may decrypt traffic as required and send traffic in clear to a packet parser and validator, e.g., packet parser and validator 406 of FIG. 4. At block 506, the packet parser and validator may parse the data into opaque tokens. The packet parser and validator may communicate with a database API layer, e.g., database API layer 416 of FIG. 4, to access a secure identity data store and/or a user/policy cache data store, e.g., the secure identity data store 426 and/or the user/policy cache data store 428 of FIG. 4, in order to validate the packet. The packet parser and validator may collect statistics via a runtime information and statistics data store, e.g., the runtime information and statistics data store 424 of FIG. 4, likewise accessed through the database API layer. The packet parser and validator may pass packets to a rule engine, e.g., the rule engine 408 of FIG. 4. At block 508, information contained in the packet, e.g., session table information and/or parsed data, may inform the rule engine which action(s) to take. For example, if the data object was encrypted or compressed on the way to the Cloud, the packet information may instruct the rule engine to decrypt or decompress the data during retrieval. The rule engine may take the designated action based on information contained in the packet and send traffic to the adaptor, e.g., adaptor 412 of FIG. 4. At block 510, the adaptor may adapt the packet as appropriate based on the policies of the Enterprise, e.g., API mapping and/or the required authentication/building of messages as required by the destination Enterprise. The packet may then be sent to the Enterprise user via the secure proxy.

Figure 6:
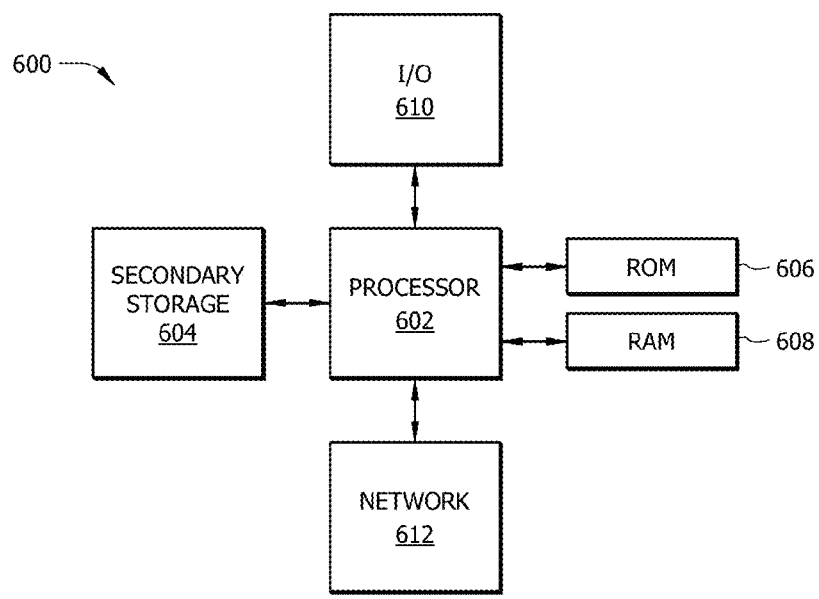
FIG. 6 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 6 is a schematic diagram of a general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more general-purpose CPU chips, or may be part of one or more application specific integrated circuits (ASICs).

The secondary storage 604 is typically comprised of one or more disk drives or erasable programmable ROM (EPROM) and may be used for non-volatile storage of data. Secondary storage 604 may be used to store programs that are loaded into RAM 608 when such programs are selected for execution. The ROM 606 may be used to store instructions and perhaps data that are read during program execution. ROM 606 may be a non-volatile memory device that typically has a small memory capacity relative to the larger memory capacity of secondary storage 604. The RAM 608 may be used to store volatile data and perhaps to store instructions. Access to both ROM 606 and RAM 608 may be typically faster than to secondary storage 604.

Figure 7:
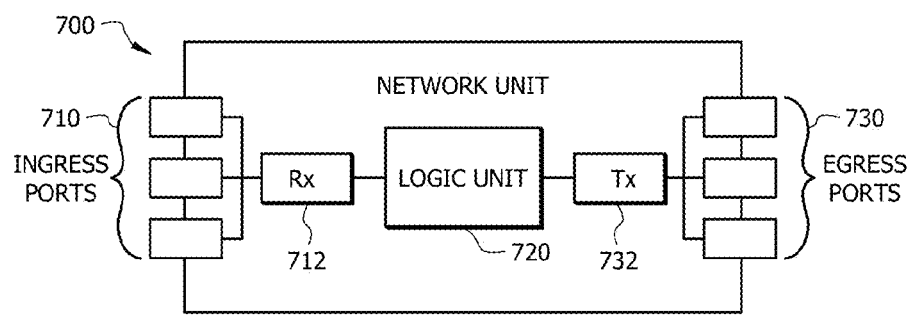
FIG. 7 is a schematic diagram of an embodiment of a network unit.

At least some of the features/methods described in the disclosure may be implemented in a network apparatus or component, such as a network node or unit, e.g., general-purpose network component 600. For instance, the features/methods in the disclosure may be implemented using hardware, firmware, and/or software installed to run on hardware. The network apparatus/component or unit may be any device that transports frames through a network, e.g., a switch, router, bridge, server, etc. FIG. 7 is a schematic diagram of a network unit 700, which may be any device or component that transports and processes data through a network. For instance, the network unit 700 may correspond to a router, bridge, or switch in a network. The network unit 700 may also comprise any suitable memory architecture. The network unit 700 may comprise one or more ingress ports or units 710 coupled to a receiver (Rx) 712 for receiving packets, objects, or Type Length Values (TLVs) from other network components. The network unit 700 may comprise a logic unit 720 to determine which network components to send the packets to. The logic unit 720 may be implemented using hardware, software, or both. The network unit 700 may also comprise one or more egress ports or units 730 coupled to a transmitter (Tx) 732 for transmitting frames to the other network components. The receiver 712, logic unit 720, and transmitter 732 may also be configured to implement or support the methods 300 and/or 500. The components of the network unit 700 may be arranged as shown in FIG. 7, or according to any arrangement suitable for carrying out one or more operations disclosed herein. Furthermore, it is to be understood that some embodiments may include two or more network units 700, or a separate general-purpose network component 600 working in conjunction with one or more network units 700.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for controlling access to a plurality of cloud networks, wherein the method is implemented in a gateway with a cloud interface and an enterprise interface, and wherein the method comprises:
    establishing an enterprise session with an enterprise user via the enterprise interface to obtain an enterprise security key unique to the enterprise user;
    establishing a cloud session with a first of the cloud networks via the cloud interface to obtain a cloud security key unique to the gateway and the first cloud network;
    creating an enterprise session to cloud session mapping by mapping the enterprise security key to the cloud security key;
    storing the enterprise session to cloud session mapping in a secure key store located in the gateway;
    receiving a packet comprising the enterprise security key from the enterprise user via the enterprise interface;
    replacing the enterprise security key in the packet with the cloud security key; and
    forwarding the packet comprising the cloud security key to the first cloud network via the cloud interface,
    wherein the cloud security key is not provided to the enterprise user to prevent the enterprise user from obtaining direct access to the first cloud network.

2. The method of claim 1, wherein the secure key store is configured for storing keys specific to a plurality of enterprise users, keys for interfacing with the plurality of cloud networks, and session mappings between the enterprise user keys and the cloud network keys.

3. The method of claim 2, further comprising:
    monitoring performance data associated with the plurality of cloud networks based on packets received from the cloud networks, wherein the performance data includes at least one of load factor, response time, latency, time of day, cost, available bandwidth, public accessibility, network loss, gating speeds, and resource security; and
    selectively distributing resource requests from the plurality of enterprise users to the plurality of cloud networks based on the performance data.

4. The method of claim 1, wherein the packet from the enterprise user comprises a destination address associated with a first destination, and wherein the method further comprises changing the destination address from the first destination to a second destination associated with one of the plurality of cloud networks such that the destination address change is opaque to the enterprise user.

5. The method of claim 1, further comprising applying a policy to the packet prior to forwarding the packet to the first cloud network, wherein the policy is selected from a group consisting of: encryption, compression, optimization, traffic steering, traffic distribution, de-identification, and re-identification.

6. The method of claim 1, further comprising:
    receiving traffic from at least one of the cloud networks via the cloud interface, wherein the traffic comprises the cloud security key and a destination address associated with the enterprise user;
    replacing the cloud security key with the enterprise security key; and
    forwarding the traffic to the enterprise user.

7. The method of claim 1, further comprising:
    evaluating contents of the packet based on at least one metric selected from a group consisting of: size, confidentiality, protocol compliance, and threat potential; and
    applying a policy on the packet based on results of the evaluation prior to forwarding the packet.

8. The method of claim 1, further comprising:
    evaluating the packet based on information specific to the enterprise user, wherein the information specific to the enterprise user is selected from a group consisting of: user geographic location, user identity, user-group identity, user access type, user device type, and user-requested resource; and
    applying a policy on the packet prior to forwarding the packet.

9. A method for exchanging data between an enterprise user and a plurality of cloud networks, wherein the method is implemented in an enterprise policy enabler with a cloud interface and an enterprise interface, and wherein the method comprises:
    establishing an enterprise session with the enterprise user via the enterprise interface to obtain an enterprise security key unique to the enterprise user;
    establishing a cloud session with the cloud networks via the cloud interface to obtain a cloud security key unique to a private cloud network;
    creating an enterprise session to cloud session mapping by mapping the enterprise security key to the cloud security key;
    storing the enterprise session to cloud session mapping in a secure key store;
    receiving a packet from the enterprise user via the enterprise interface, wherein the packet comprises the enterprise security key and a request for access to at least one resource associated with a public cloud network;

modifying packet data to modify the request based on at least one policy associated with the plurality of cloud networks, wherein modifying the request comprises replacing the enterprise security key with the cloud security key based on the enterprise session to cloud session mapping; and forwarding the packet to a resource of the private cloud network via the cloud interface, wherein the modifying the request based on the policy comprises redirecting the packet from the public cloud network to the private cloud network based on a determination that the policy prohibits access to the public cloud network resource due to confidential data stored in the packet data.

10. The method of claim 9, further comprising:

receiving a second packet from a second enterprise user, the second packet comprising a second request for a third resource;

modifying packet data of the second packet to modify the second request based on a second policy associated with the plurality of cloud networks; and selecting the second policy based on information specific to the second enterprise user, wherein the information specific to the second enterprise user is selected from a group consisting of: user geographic location, user identity, user-group identity, user access type, user device type, and user-requested resource.

11. The method of claim 9, further comprising selecting the at least one policy based on information specific to the public cloud network resource or the private cloud network resource, wherein the information specific to the public cloud network resource or the private cloud network resource is selected from a group consisting of: load factor, response time, latency, time of day, cost, available bandwidth, public accessibility, network loss, gating speeds, and resource security.

12. The method of claim 9, wherein the at least one policy is selected from a group consisting of: encryption, compression, optimization, traffic steering, traffic distribution, de-identification, and re-identification.

13. The method of claim 9, further comprising:

receiving traffic from the private network via the cloud interface, wherein the traffic is associated with the enterprise user's request for the public cloud resource;

modifying the traffic based on at least one policy associated with an enterprise network associated with the enterprise user, wherein modifying the traffic comprises rendering redirection of the enterprise user's request for the public cloud resource opaque to the enterprise user by modifying traffic address information; and sending the traffic to the enterprise user via the enterprise interface and the enterprise network.

* * * * *